May 24, 1932.  G. BILLINGS  1,860,222
HAYSTACKER
Filed Oct. 17, 1929  3 Sheets-Sheet 1
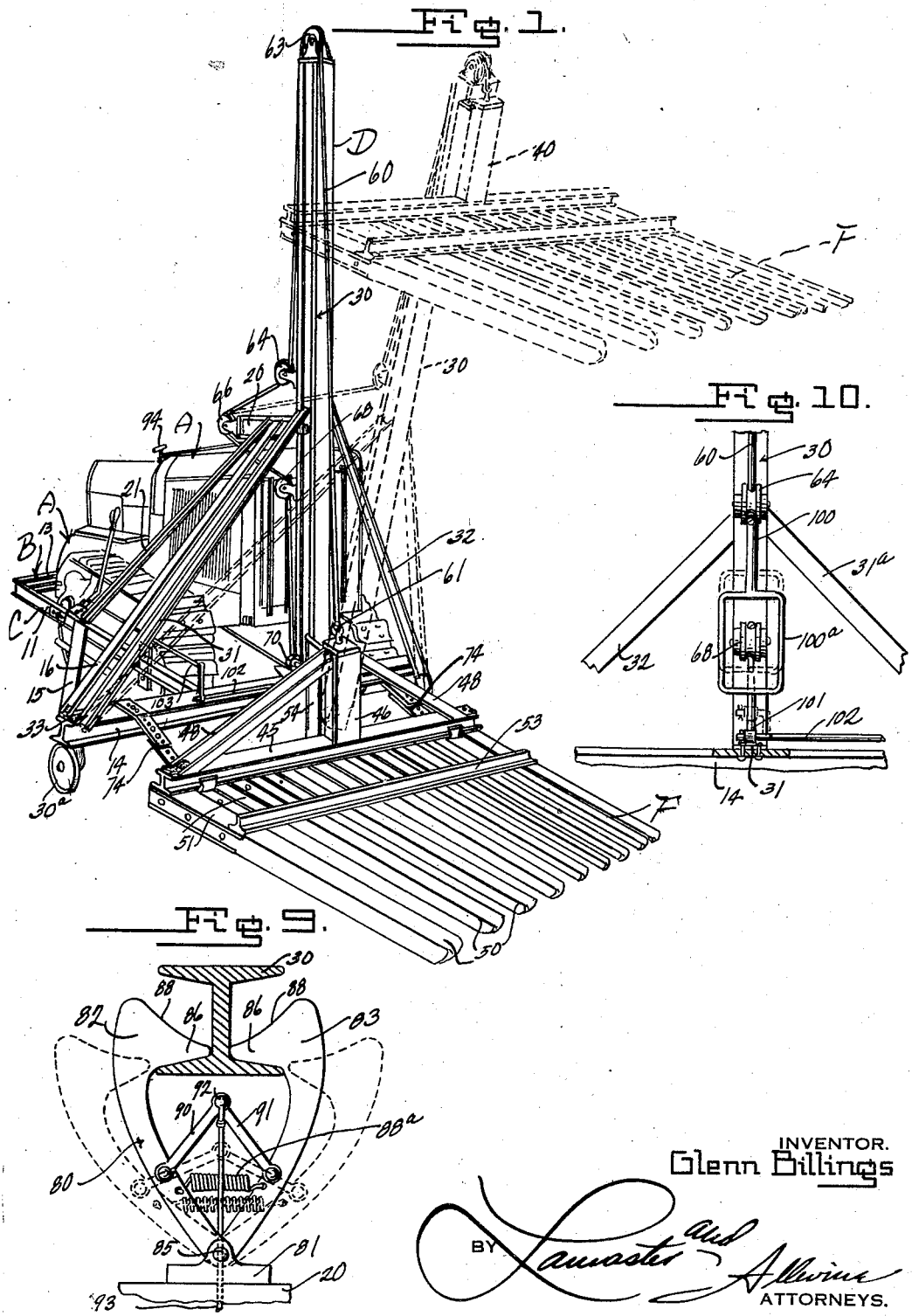
INVENTOR.
Glenn Billings
BY
ATTORNEYS.

May 24, 1932. G. BILLINGS 1,860,222
HAYSTACKER
Filed Oct. 17, 1929 3 Sheets-Sheet 2
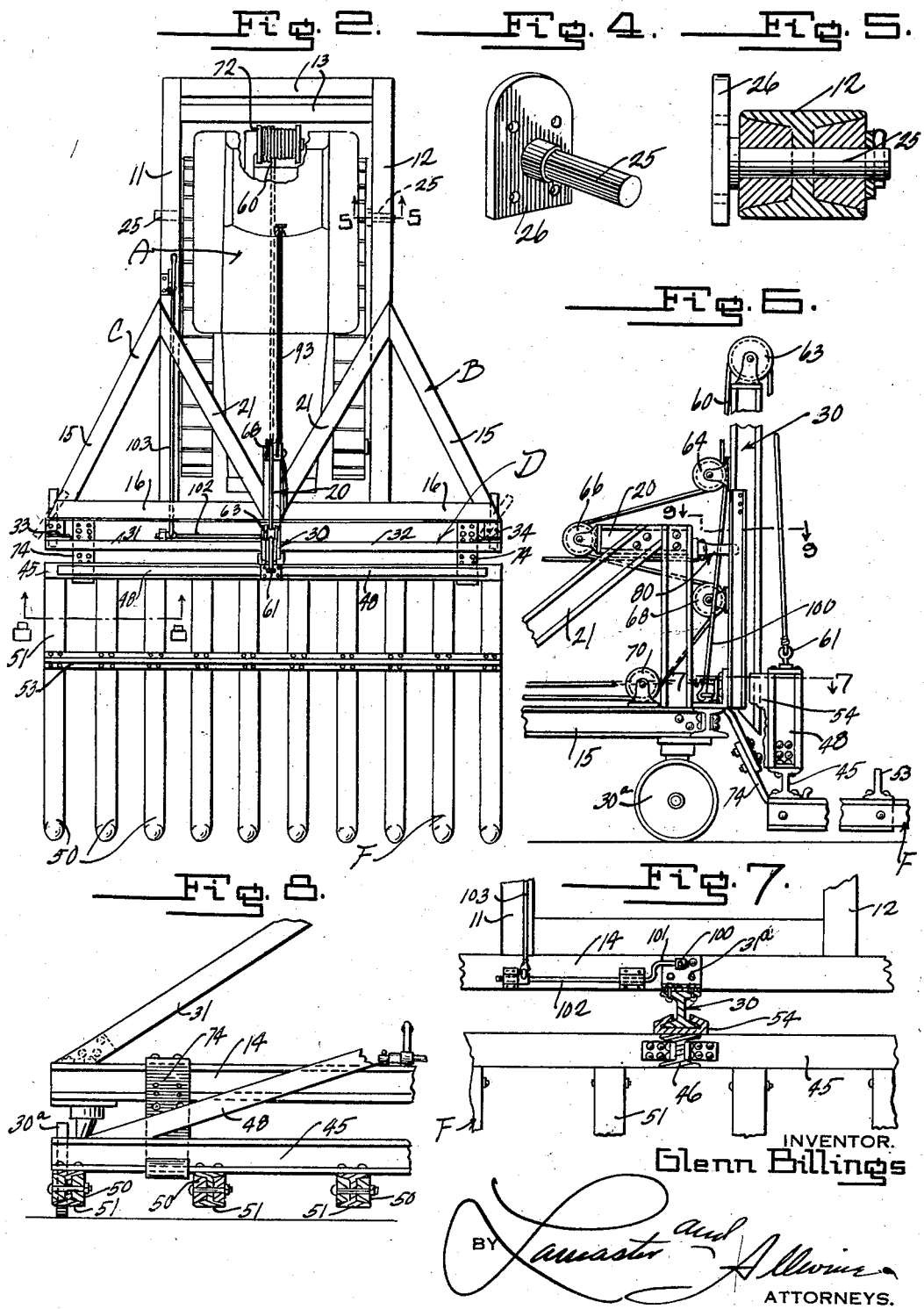
INVENTOR.
Glenn Billings

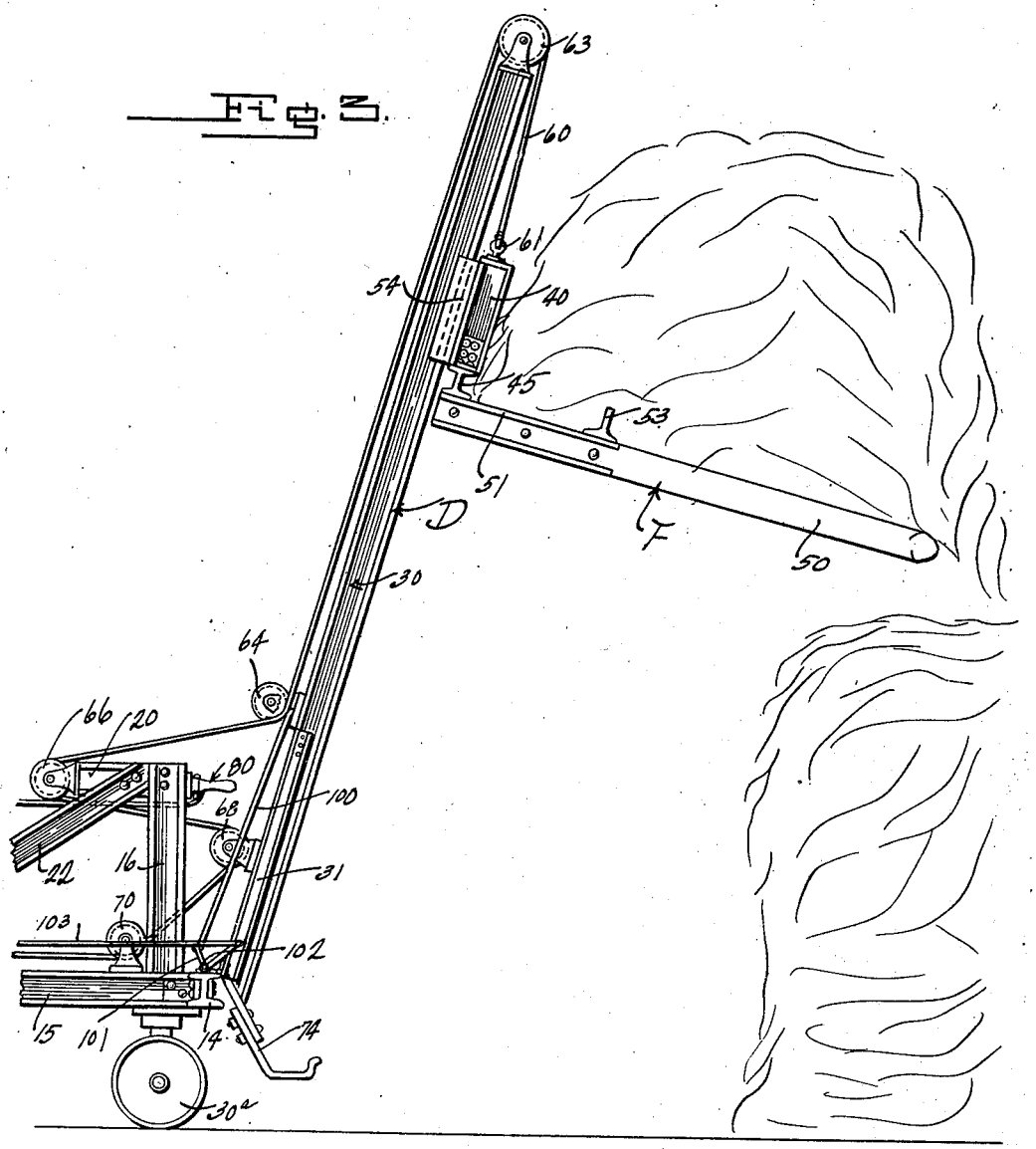

Patented May 24, 1932

1,860,222

UNITED STATES PATENT OFFICE

GLEN BILLINGS, OF CODY, WYOMING

HAYSTACKER

Application filed October 17, 1929. Serial No. 400,356.

This invention relates to improvements in hay loading and stacking devices.

The primary object of this invention is the provision of an improved hay loading and stacking device, which may be conveniently attached to a tractor and operated for expeditiously handling large quantities of hay or other materials.

A further object of this invention is the provision of an improved hay loading and stacking device which serves as an attachment for conventional tractors, and which includes a hay receiving carrier mounted so that it may gather large quantities of hay; improved means being provided for elevating the load of hay in a vertical plane and tipping the load bodily to a position where the same may be conveniently dumped at a considerable distance from the tractor, thus insuring that the device may be used under practical circumstances where it is desired to have the tractor spaced at proper working distances from a stack of hay upon which the load is to be dumped.

Other objects and advantages of this invention will be apparent during the course of the following detailed description.

In the drawings, wherein for the purpose of illustration is shown only a preferred embodiment of the invention, Figure 1 is a perspective view showing the improved hay stacking device as attached to a tractor, and showing in dotted lines the inclined relation of the carrier and its support, as assumed during a dumping operation.

Figure 2 is a plan view of the improved hay stacking device, showing it attached to a tractor.

Figure 3 is a fragmentary side elevation, showing the position of the carrier and supporting parts of the frame, with the attachment and its parts in the position they will assume during a dumping operation, after proper elevation of a load.

Figure 4 is a perspective view of a frame supporting spindle which may serve to connect the frame of the hay stacker to the chassis or other part of a tractor.

Figure 5 is a sectional view taken substantially on the line 5—5 of Figure 2.

Figure 6 is a fragmentary view showing the front end of a tractor with the attachment connected thereto and the relation in which the movable rake, fork, or load carrier may be lowered with respect to other parts of the frame and the tractor, for operating close to the ground in a position where the entire load may be taken thereby.

Figure 7 is a sectional view taken substantially on the line 7—7 of Figure 6.

Figure 8 is a fragmentary sectional view taken substantially on the line 8—8 of Figure 2.

Figure 9 is a fragmentary sectional view taken through details of a detent or restraining device; the view being taken substantially on the line 9—9 of Figure 6.

Figure 10 is a fragmentary sectional view showing a detent mechanism for the operating cable.

In the drawings, wherein similar reference characters designate corresponding parts throughout the several views, the letter A may generally designate a tractor of any approved construction, with which the improved stacker B may be operatively associated in a detachable relation, so that the tractor may be used for other purposes than haystacking and loading. The haystacking device B preferably comprises a frame C connected to the chassis or other parts of the tractor A and having a movable upright frame D associated therewith for support of a rake, or load carrier F.

Referring to the frame D, the same includes side beams 11 and 12 adapted for disposal at opposite sides of the tractor chassis, being connected at their rear ends by suitable cross beams 13, and connected at their front ends to a front cross beam 14, shown in Figure 1, which at its ends extends beyond the side beams 11 and 12; the outer ends being connected by diagonal struts 15 with the side beams 11 and 12, for bracing purposes. The material of the beams 11 to 15 inclusive may vary. However, it is preferably of metal, or channel or angle cross section, or of I-beam construction, as found necessary. Upwardly convergent beams 16 extend from the opposite ends of the front cross beam or rail 14; being fixedly secured at their lower ends with the frame beam 14, and at their upper ends being connected to the forward end of a short horizontal beam 20, which extends rearwardly as shown in Figure 3 of the drawings. This beam 20 is additionally reinforced by downwardly and rearwardly extending divergent beams 21, shown in Figure 2 of the drawings, and elsewhere, which may be of channel or angle section, and at their lower ends being connected upon the beams 11 and 12 intermediate the ends of the latter, in any approved manner. This provides a very durable framework.

The beams 11, 12, 13 and 14 define a rectangular shaped frame which is adapted to receive the tractor chassis therein; the frame as thus constructed being pivoted near the rear ends of the rails 11 and 12, on suitable spindles 25, which have attaching plates 26 secured to opposite sides of the chassis of the tractor, in the position shown in Figure 2 of the drawings. This pivots the longitudinal frame casing intermediate its ends upon the chassis of the tractor. The fore part of the frame C is of course the heavier, and it is supported directly upon the ground over which the device may operate, by means of caster wheels 30ª secured in proper relation at the ends of the beam 14, as shown in various views of the drawings. Thus, the front end of the frame C may follow the contour of the ground over which the tractor and hay loading device is being operated, for insuring a proper loading operation of the carrier F, in a manner to be subsequently detailed.

Referring to the upright frame structure D, the same comprises an upright 30, which is of channel-shaped cross section, as more particularly shown in Figure 7, the said upright at its lower end is hingedly connected at 31ª upon the front beam 14 of the frame D, and about the midway point of the latter, so as to position the upright 30 along the longitudinal axis of the tractor and attachment, as is quite obvious; it being understood that the beam 14 is positioned forwardly of the tractor, so that the upright 30 cooperates at this location. Downwardly extending divergent braces 31 and 32 are positioned at opposite sides of the beam 30, rigidly connected at their upper ends therewith, and at their lower ends being respectively hinged at 33 and 34 at opposite ends of the front beam 14 of the frame C, as can readily be understood from the drawings. Of course, the pivot axes of the uprights 30, 31 and 32 are all in alignment, so that the upright frame structure D, which includes said parts, may be swung forwardly and rearwardly in a vertical plane. The braces 31 and 32 may be of I-beam cross section, if found desirable.

The load carrier F is of rake or fork-like construction, including a rear horizontal beam 45, extending transverse to the longitudinal axis of the tractor, and which is preferably of I-beam cross section. Midway of the ends thereof there is provided an upright 46, which is relatively short, and securely positioned normal to the beam 45, and which at its upper end is braced by diagonal beams or braces 48, extending divergently downward from the upper end of the short member 46, and at their outer ends thereof being connected fixedly to the outer ends of the lower beam 45. The tines 50 of the carrier or rake head are preferably of durable wood construction, mounted in a novel manner upon the cross or supporting rail 45. Each tine 50 has the rear end thereof bifurcated and fitting in the opposite channels of the reinforcing and attaching I-beam member 51. The I-beam members 51 have the bifurcated ends of the tines 50 secured as shown in Figure 8. The I-beam members 51 are welded or otherwise rigidly and fixedly secured at their rear ends to the beam 45, preferably beneath the latter, as shown in Figure 1. At their free ends the I-beam members 51 are connected together by a T-shaped cross member 53 which reinforces and connects the tines in their parallel relation.

At its rear side the upstanding post 46 of the carrier F is provided with an elongated connecting channel or member 54, which engages the opposite side flanges of the vertical upright 30, in the relation shown in Figure 7 of the drawings to slidably connect the carrier or rake head F upon the standard 30 for movement therealong.

The operating means for elevating and lowering the rake head or carrier F includes the provision of a cable 60, connected at one end 61 to the top of the post 46 of the carrier F; the cable 60 extending upwardly along the forward side of the post and being trained about a pulley 63 on top of the post 30. The cable 60 is then trained rearwardly along the standard 30, and beneath a pulley 64 disposed on the standard 30 near the lower end of the latter, but above the top beam 20 of the frame C, as shown in the drawings. Therefrom the cable 60 is trained rearwardly about a pulley 66 on the rear end of the horizontal beam member 20, and therefrom the cable 60 is trained beneath the beam 20, in a forwardly extending direction about a pulley 68 secured on the standard 30 at a location beneath the beam 20, as is shown in Figures 1, 3 and 6 of the drawings. Therefrom the cable 60 is trained beneath a pulley 70 mounted upon the forward part of the frame C, and extended beneath or along the chassis of the tractor A, and wound upon a suitable winch 72 at the rear of the tractor A, which may be power operated to wind or unwind the cable 60 with respect thereto.

Brackets 74 are secured upon the cross beam 14 of the frame C, extending forwardly and downwardly, and adapted to support and hold the cross rail 45 of the carrier F when the latter is in its lowermost position, so that the tines will be held relatively close to the ground, yet in a position where they may not contact therewith, as will be readily apparent from Figures 6 and 8 of the drawings. It is to be noted from Figure 6 that in this position the tines 50 lie very close to the ground, so that all of the hay or other materials may be lifted off the ground. In its lowermost position, of course, the channel member 54 is still slidably connected upon the standard 30, for guiding vertical movement of the carrier.

During a loading operation of the carrier, and during the vertical movement thereof along the standard 30, it is intended that the latter shall be maintained substantially in a vertical position. Remembering that the frame D, which includes the standard 30, swings forwardly when depositing a load of hay or other materials upon a stack, it is readily apparent that any detent intended to hold the standard 30 vertically, or substantially so, must be one which will automatically grip the frame D or the standard 30 upon the return thereof after a stack dumping operation, for holding it in proper position for a lowering and elevating movement of the carrier. To this end, there is provided upon the forward end of the frame C, and more particularly at the forward end of the short beam 20, a detent construction, shown more particularly at 80 in Figure 9 of the drawings, which includes a plate 81 secured upon the front end of the beam 20, and provided with jaws 82 and 83 pivoted on a common axis or pin 85 on the plate 81. The jaws 82 and 83 at their free ends are offset inwardly at 86, and adapted to grip the opposite flanges of the upright 30, in the position shown in Figure 9, for maintaining the frame D in its vertical position for elevation and lowering of the carrier F. A spring 88$^a$, under compression, engages at opposite ends with the jaws 82 and 83, remote from their common pivot, for the purpose of clamping the jaws against the upright 30. It is to be noted that the jaws 82 and 83 are concavely sloped at 88 on their outer edge in a convergent relation rearwardly, so that when the upright 30 is moved from its forward swung position to a rear position, the same engaging against the edges 88 will pry the jaws 82 and 83 apart, against action of the spring 88$^a$, and enable the upright 30 to be slipped to its restrained position, as shown in Figure 9 of the drawings.

To insure a manual opening of the jaws 82 and 83 for release of the upright 30, when so desired, there are provided a pair of links 90 and 91, respectively pivoted upon the jaws 82 and 83, intermediate the ends thereof. The links 90 and 91 converge forwardly and along the medial axis of the detent mechanism 80 and are connected on a common pivot 92. At this pivot 92 the cable 93 is connected, which extends rearwardly to some suitable handle 94, where the same may be conveniently grasped, and upon rearward pulling the links 90 and 91 will be expanded for opening the jaws 82 and 83 for a release of the upright 30, in a manner which is perfectly apparent from Figure 9 of the drawings.

With reference to the operation of the device, the tractor A is of course moved forwardly with the raking head F in the lowered position shown in Figure 1, and in this relation the detent mechanism 80 holds the upright frame D in its vertical position. The carrier F having plunged into the bottom of the load, the operator will cause the winch 72 to be operated for winding the cable 60 thereon. This will of course elevate the carrier F to the desired plane upon the frame upright 30, near the top of the stack. The operator will then release the detent 80 by means of the cable 93 above described, and the frame D, by reason of the eccentric load positioned thereon, will swing forwardly, and the operator may control the winch 72 for permitting the frame D to swing to the desired forward position for unloading the hay. In this connection it is to be noted that the cable 60 operating about the pulley 66 enables a control of the swinging of the frame D.

In order that the carrier F may be locked in a predetermined elevation upon the frame D, and more specifically along the upright 30, and to permit of a swinging of the frame D forwardly or rearwardly, to control the winch cable 60, a detent is provided to lock the cable 60 upon the upright 30, which consists of a wedging arm 100, shown in Figures 6, 7 and 10 of the drawings, pivoted at its lower end to a crank 101 of a shaft 102. The shaft 102 is pivoted on a fixed axis on top of the beam 14, as shown in Figure 7. An operating lever 103 has a connection to this shaft 102 for turning the same. Upon rearward pull upon the lever 103 the shaft 102 will be operated for shoving the wedging arm 100 at its free end upwardly between the upright 30 and the pulley 64, wedging the cable 60 between the pulley 64 and the upright 30, and locking the carrier F in a desired elevation along the frame upright 30. Of course, in this position, the cable 60 may still be fed back and forth upon the winch 72 for swinging the frame D bodily upon its pivot axis, so that the load may be positioned in the desired relation upon a stack. The wedge arm 100 includes a loop 100$^a$, as shown in Figure 10, for accommodating the pulley 68 and cable trained thereover in the position of parts shown in the drawings.

Various changes in the shape, size, and arrangement of parts may be made to the form of invention herein shown and described, without departing from the spirit of the invention or the scope of the claim.

I claim:

In a haystacking device the combination of a frame, an upright frame swingably hinged at its lower end to the first mentioned frame, an elevator slidable along the upright frame, a flexible cable connected with said elevator, means training said cable from its connection with the elevator upwardly along the upright frame and in a slidable relation over the top of the upright frame and thence downwardly along the upright frame to a point intermediate the ends of the upright frame and there having a slidable connection thereon, a pulley mounted on a fixed axis upon said frame appreciably spaced from the upright frame and receiving said cable thereover from said last mentioned slidable connection, said cable having another slidable connection upon said upright frame below said pulley and being trained thereover from said pulley, said cable at its free end having means to operate the same so that the elevator may be moved up or down and the upright frame swung forwardly and rearwardly.

GLEN BILLINGS.